July 22, 1952    J. R. STONE    2,604,619
VOLTAGE REGULATION
Filed Oct. 3, 1950
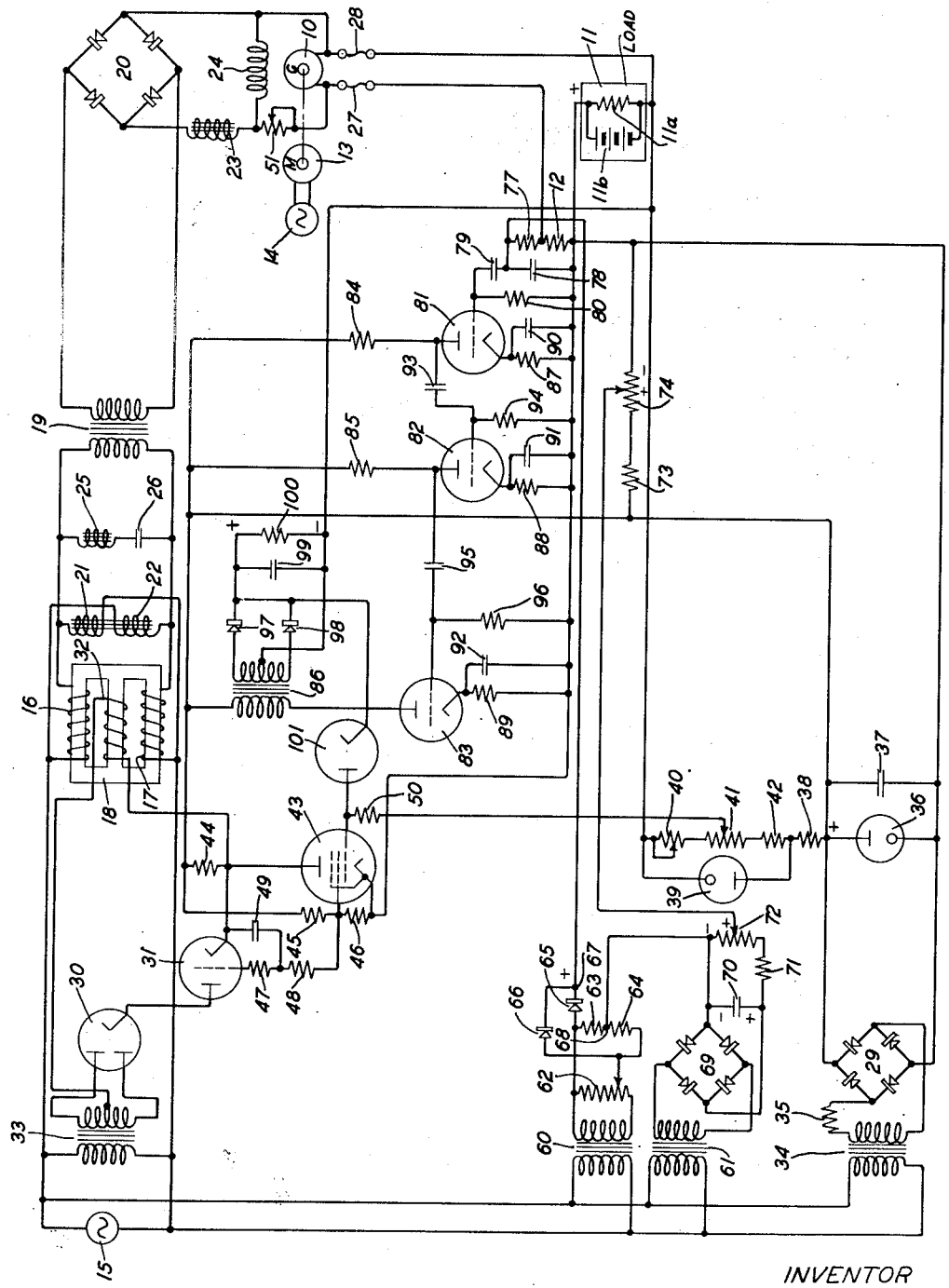
INVENTOR
J. R. STONE
BY
G. F. Heuerman
ATTORNEY Patented July 22, 1952

2,604,619

UNITED STATES PATENT OFFICE 2,604,619

VOLTAGE REGULATION

John R. Stone, West Orange, N. J., assignor to Bell Telephone Laboratories, Incorporated, New York, N. Y., a corporation of New York Application October 3, 1950, Serial No. 188,190

8 Claims. (Cl. 322—25)

This invention relates to voltage regulation and particularly to apparatus for controlling the energization of a field winding of a direct-current generator to control its output voltage.

An object of the invention is to provide novel apparatus for controlling the voltage of a direct-current source which supplies current to a load to maintain the load voltage substantially constant for load currents up to a predetermined maximum amplitude and for causing the source voltage to decrease abruptly when the load current rises above said maximum amplitude.

Another object is to provide highly sensitive regulating apparatus for protecting a generator against excessive overload.

In a specific embodiment of the invention herein shown and described for the purpose of illustration, there is provided apparatus for regulating the output voltage of a direct-current generator to maintain the voltage across a load substantially constant over a predetermined range of load current and for causing the generator voltage to decrease abruptly when the load current rises above the maximum amplitude of said range, thereby preventing an excessive overload. There is provided for supplying current to the generator field winding a rectifier to which alternating current is supplied through a saturable reactor the impedance of which is varied by controlling the direct current supplied to its saturating winding. The direct current is supplied to the saturating winding through the space current path of a space current device the resistance of which may be varied in response to changes of output voltage of a direct-current amplifier upon the input circuit of which is impressed a control voltage having two voltage components one of which is proportional to the load voltage. The second control voltage component is obtained by combining a voltage proportional to the load current with an opposing pulsating voltage of substantially fixed amplitude, suppressing the direct component and amplifying the alternating components of the difference voltage and rectifying the amplified voltage, the rectified voltage being effectively combined with the first voltage component only when the load current exceeds a predetermined amplitude.

The single figure of the accompanying drawing is a schematic view of a regulator for a direct-current generator which embodies the invention.

Referring to the drawing, there is shown a direct-current generator 10 for supplying direct current to a load circuit comprising a load 11 and in series therewith a resistor 12. The load 11 may comprise a resistive portion 11a and a battery 11b floating across the resistive portion 11a, for example. The resistance of the resistor 12 is very small compared with the minimum value of the load resistance 11a. The generator 10 is driven by a motor 13 when energized by current from an alternating-current supply source 14. Fuses 27 and 28 are provided in the generator output leads in series with the load. Alternating current from a source 15 is supplied through the windings 16 and 17 of a saturable reactor 18 to the primary winding of a transformer 19 the secondary winding of which is connected to the input terminals of a varistor bridge rectifier 20. There is provided a reactor having a winding 21 connected across winding 17 and the primary of transformer 19 in series and having a winding 22 connected across winding 16 and the primary of transformer 19 in series. The rectifier 20 supplies current through an inductance coil 23 to the field winding 24 of the generator 10. A portion of the current through field winding 24 is supplied from the generator 10 through a rheostat 51. An inductance coil 25 and a condenser 26 in series are connected in a shunt path across the primary winding of transformer 19 to reduce the amplitude of harmonics introduced by the saturable reactor 18 and thereby reduce the peak inverse voltage across the elements of rectifier 20.

A rectifier comprising a space current tube 30 is provided for rectifying current from source 15 and for supplying the rectified current through the space current path of a triode space current device 31 to a saturating winding 32 of the saturable reactor 18, the winding 32 being on the middle leg of a three-legged core and windings 16 and 17 being on the outer legs, respectively. The rectifier comprises a transformer 33 having a primary winding connected to the source 15 and a secondary winding connected to the anodes of tube 30, a mid-tap of the secondary winding being connected to one terminal of saturating winding 32, the cathode of tube 30 being connected to the anode of tube 31 and the cathode of tube 31 being connected to the second terminal of winding 32.

There is provided a varistor bridge rectifier 29 to which current is supplied through a transformer 34 the primary winding of which is connected to the alternating-current supply source 15. The secondary transformer winding is connected to the input terminals of rectifier 29 through a series resistor 35. A cold cathode gas-filled voltage regulating tube 36 and a condenser 37 are connected in parallel across the output terminals of the rectifier 29 to reduce variations of output voltage of the rectifier, voltage changes due to variations of voltage of the supply source 15 appearing across resistor 35. Another shunt path across the output of rectifier 29 comprises in series a resistor 38 and a second cold cathode voltage regulating tube 39 and the load 11. A voltage divider connected across constant voltage tube 39 comprises in series a rheostat 40, a potentiometer 41 and a resistor 42.

A direct-current amplifier comprising a space current tube 43 is provided for controlling the grid-cathode voltage of tube 31 to control its anode-cathode resistance in response to a control voltage impressed upon the control grid-cathode circuit of tube 43. The space current circuit of tube 43 may be traced from the positive output terminal of rectifier 29 through resistor 44 to the anode and from the cathode of tube 43 to the negative output terminal of rectifier 29. A voltage divider comprising resistors 45 and 46 in series is connected across resistor 44 and the anode-cathode path of tube 43 in series. The cathode of tube 31 is connected to the anode of tube 43 and the control grid of tube 31 is connected through resistors 47 and 48 in series to the common terminal of resistors 45 and 46, a condenser 49 being provided in a path connecting the cathode of tube 31 and the common terminal of resistors 47 and 48. The screen grid of tube 43 is connected to the common terminal of resistors 45 and 46.

A circuit may be traced from the control grid of tube 43 through a resistor 50 to the variable tap of potentiometer 41, through a portion at least of the potentiometer resistance, through rheostat 40 and through the load 11 to the cathode of tube 43. In this circuit, the substantially constant voltage across potentiometer 41 and rheostat 40 is in opposition to the voltage across the load 11. Considering the circuit only as thus far described, there is impressed upon the control grid-cathode circuit of tube 43 a unidirectional voltage which makes the grid suitably negative with respect to the cathode and having the variations which are present in the load voltage. An increase of load voltage, for example, has the effect of making the control grids of tubes 43 and 31 relatively more negative with respect to the respective cathodes, thereby increasing the resistance of the space current path of tube 31 and decreasing the current supplied to saturating winding 32 of the saturable reactor 18. The impedance of winding 16 and 17 of the saturable reactor is thus increased to effect a reduction of the current supplied through rectifier 20 to the field winding 24 of generator 10. As a result, the generator output voltage decreases to cause the initially assumed rise of load voltage to be minimized.

The load voltage is maintained substantially constant, as described above, when the current supplied from generator 10 to the load circuit is not greater than a predetermined maximum amplitude. When the load current rises above the maximum amplitude, however, means are provided for reducing the output voltage of generator 10 in response to an increase of load current to minimize the increase of load current, as described below. It is desired to supply current from generator 10 to the load, while maintaining the load voltage substantially constant, which current at times exceeds the rated output of the generator by a considerable amount and which is less than the current required to blow the fuses 27 and 28 for protecting the generator by only a small percentage. For example, if the generator 10 is rated at 1200 amperes, the maximum current supplied to the load at constant voltage may be 1380 amperes and the fuses 27 and 28 may be rated at 1500 amperes. Moreover, the resistor 12 preferably has a resistance such that it introduces a voltage drop in the load circuit of only 250 millivolts at 1200 amperes or 0.2083 millivolt per ampere. The increase in voltage drop across resistor 12 for a load current increase from 1380 to 1500 amperes is, therefore, about 25 millivolts. It will be apparent, therefore, that a very sensitive control circuit must be provided which, in the specific example given, will become effective only when the voltage across resistor 12 reaches 287 millivolts and which will limit the voltage across resistor 12 to a value less than 312 millivolts, an increase of less than 25 millivolts.

There are provided transformers 60 and 61 having their primary windings connected to the alternating-current supply source 15. A potentiometer 62 is connected across the secondary winding of transformer 60 and equal resistors 63 and 64 in series are connected across a variable portion of potentiometer 62. The terminals of resistors 63 and 64 which are connected to the potentiometer 62 are respectively connected through asymmetrically conducting varistors or rectifying elements 65 and 66 to an output terminal 67, the common terminal 68 of resistors 63 and 64 being the other output terminal. A pulsating unidirectional voltage appears across terminals 67 and 68, a pulse being produced during each half cycle period of the source 15. The amplitude of these pulses will vary with voltage changes of the source 15. The secondary winding of transformer 61 is connected to the input terminals of a varistor bridge rectifier 69. The output current of this rectifier is supplied through a ripple filter comprising a shunt condenser 70 and a series resistor 71 to a potentiometer 72. The filter suppresses alternating components having a frequency equal to the frequency of the source and harmonics thereof. A voltage divider comprising in series a resistor 73 and a potentiometer 74 is connected across the output of rectifier 29 the output voltage of which is maintained substantially constant due to the action of voltage regulator tube 36 and resistor 35.

There is impressed across the current path comprising a resistor 77 and resistor 12 in series in opposition to the voltage across resistor 12 a voltage equal to the pulsating voltage across terminals 67 and 68 plus the voltage across a portion of potentiometer 74 minus the voltage across a portion of potentiometer 72. The potentiometers 62 and 72 are adjusted so that the pulsating voltage at terminals 67 and 68 is equal to the voltage across the effective portion of potentiometer 72 between its adjustable contact and the terminal 68. The magnitude of the pulse impressed across resistors 77 and 12 in series will thus be equal to the voltage across the effective portion of potentiometer 74 between its variable tap and the negative terminal of rectifier 29, these pulses being of substantially constant amplitude since the voltage changes across terminals 67 and 68 due to line voltage changes are compensated for or eliminated by the equal and opposing voltage changes across the effective portion of potentiometer 72. The magnitude of the pulses is adjusted by means of potentiometer 74 to a desired amplitude which under all operating conditions is preferably somewhat larger than the voltage across resistor 12. A condenser 78 is connected across resistors 12 and 77 in series and there are connected across condenser 78 a condenser 79 and a resistor 80 in series. There will be set up across condenser 78 a pulsating voltage which decreases as the voltage across resistor 12 increases due to an increase in load current, and vice versa. When the voltage across condenser 78 is increasing, current flows through condenser 79 and resistor 80 in one direction to charge condenser 79 and when the voltage across condenser 78 is falling, condenser 79 discharges to cause current to flow in the opposite direction through resistor 80. There is thus set up across resistor 80 an alternating voltage the amplitude of which decreases as the load current increases.

The alternating voltage across resistor 80 is amplified by the alternating-current amplifier comprising space current triodes 81, 82 and 83 each of which is supplied with space current from the rectifier 29. For this purpose the anodes of tubes 81, 82 and 83 are connected through resistors 84 and 85 and the primary of a transformer 86, respectively, to the positive output terminal of rectifier 29 and the cathodes of the tubes are connected through resistors 87, 88 and 89, respectively, to the negative output terminal of rectifier 29, resistors 87, 88 and 89 being shunted by condensers 90, 91 and 92, respectively. The anode-cathode circuit of tube 81 is coupled through a condenser 93 and a resistor 94 to the grid-cathode circuit of tube 82 the anode-cathode circuit of which is coupled through a condenser 95 and a resistor 96 to the grid-cathode circuit of tube 83. The alternating voltage across the secondary winding of transformer 86 is rectified by the asymmetrically conducting varistors 97 and 98 to set up across a condenser 99 and a resistor 100 connected in parallel a direct voltage which decreases as the load current flowing through resistor 12 increases. There is provided a diode 101 the anode of which is connected to the control grid of tube 43 and a terminal of resistor 50 and the cathode of which is connected to the positive terminal of the voltage across resistor 100.

It will now be seen that the circuit connecting the control electrode and cathode of tube 43 comprises the load 11 the positive terminal of which is connected to the cathode and two parallel branch paths connecting the control grid to the negative terminal of the load 11. One of the branch paths comprises in series resistor 50 and the substantially constant voltage across rheostat 40 and an adjustable portion of potentiometer 41, the positive terminal of this constant voltage source being connected to a terminal of resistor 50 and the negative terminal of the constant voltage source being connected to the negative terminal of the load. The second branch path comprises in series the unidirectionally conducting diode 101 and the resistor 100 across which rectifier 97, 98 sets up a direct voltage.

When the voltage across resistor 100 in the second branch is larger than the voltage across rheostat 40 and a portion of potentiometer 41 in the first branch, the cathode of tube 101 is at a positive potential with respect to its anode and the tube is in a non-conducting state. For this condition, the voltage across resistor 100 has no effect upon the grid-cathode circuit of tube 43. However, as the load current increases to cause the voltage across resistor 100 to decrease, a condition will be reached where the voltage across rheostat 40 and a portion of potentiometer 41 is slightly greater than the voltage across resistor 100. Current will then flow through resistor 50, diode 101 and resistor 100 in a direction to make the control grid of tube 43 relatively more negative with respect to its cathode. This current flow will increase as the voltage across resistor 100 further decreases due to a further increase of load current to make the control grid still more negative with respect to its cathode.

It is seen therefore that when the current supplied to the load is less than a certain maximum value, tube 101 is non-conducting and there is impressed upon the control grid-cathode circuit of tube 43 two opposing voltages which are the load voltage and the constant voltage across rheostat 40 and a portion of potentiometer 41. Then, if the load voltage increases, the control grids of tubes 43 and 31 are made relatively more negative with respect to their cathodes to reduce the current in saturating winding 32 and thus to reduce the output voltage of generator 10 to minimize the initially assumed rise of load voltage. However, when the load current rises above said maximum value, tube 101 becomes conducting to produce a voltage drop across resistor 50 which is of the same polarity as the voltage across the load and of opposite polarity with respect to the constant voltage across rheostat 40 and a portion of potentiometer 41, all in the control grid-cathode circuit of tube 43. The effect of the voltage drop across resistor 50 is to make the control grids of tubes 43 and 31 relatively more negative with respect to the cathodes so as to reduce the output voltage of generator 10 as the load current is increased above the said maximum value. The load current is thus prevented from rising sufficiently to blow the fuses 27 and 28 and the load voltage drops from its normally substantially constant value as the load current rises above said maximum value.

What is claimed is:

1. The combination with means for supplying current from a direct-current source to a load, of means for regulating the voltage of said source comprising a space current device having an anode, a cathode and a control electrode, a control circuit connecting said control electrode and said cathode, means for impressing upon said control circuit a voltage having a first and a second voltage component, said first voltage component having variations corresponding to voltage changes across said load, means for setting up an alternating voltage the amplitude of which varies in response to changes of current supplied from said direct-current source to said load, means for amplifying said alternating voltage, means for rectifying said amplified alternating voltage to derive a rectified voltage, and means for utilizing said rectified voltage to control said second voltage component.

2. The combination with a source of direct current, means for deriving a direct voltage from said source the amplitude of which may vary, means for combining with said derived voltage a pulsating voltage of substantially fixed amplitude to produce a resultant pulsating voltage the amplitude of which may vary, means for amplifying alternating components and for suppressing the direct component of said resultant pulsating voltage and means for utilizing the amplified alternating components for controlling the voltage of said direct-current source.

3. The combination with a source of alternating voltage the amplitude of which may vary of means for deriving from said source a unidirectional pulsating voltage having amplitude variations corresponding to the amplitude variations of said source, means for deriving from said source a unidirectional voltage having an amplitude substantially equal to the amplitude of said pulsating voltage and having amplitude variations corresponding to amplitude variations of said source, alternating components of the fundamental frequency of said source and higher frequency components being suppressed, a source of substantially constant unidirectional voltage, and a circuit for combining said three unidirectional voltages, said pulsating voltage and said constant voltage having the same polarity in said circuit and said remaining voltage having an opposite polarity in said circuit.

4. The combination with a source of alternating voltage the amplitude of which may vary of means for deriving from said source a first unidirectional voltage having pulses corresponding to half cycles of said alternating voltage and having amplitude variations corresponding to the amplitude variations of said source, means for deriving from said source a second unidirectional voltage having an amplitude substantially equal to the amplitude of said pulsating voltage, said second means including means for suppressing alternating components having frequencies equal to the fundamental and harmonic frequencies of said source, means for deriving from said source a third unidirectional voltage having a substantially constant amplitude and means for combining said first, second and third unidirectional voltages with said first and third voltages in aiding relationship and with said second voltage in opposition to said first and third voltages.

5. The combination with means for supplying current from a direct-current source to a load, of means for regulating the voltage of said source comprising a space current device having an anode, a cathode and a control electrode, a source of substantially constant unidirectional voltage, a first resistor, a second resistor, means for setting up across said second resistor a unidirectional voltage which varies in response to changes of current supplied to said load, a first circuit comprising in series said constant voltage source and said first and second resistors, the voltage across said second resistor being opposed to the voltage of said constant voltage source in said circuit, unidirectionally conducting means in said first circuit for conducting current therein when the voltage across said second resistor is less than the voltage of said constant voltage source, and a second circuit connecting said control electrode and said cathode comprising in series said first resistor, said constant voltage source and said load, the voltage of said constant voltage source being opposed to the voltage across said load.

6. In combination, a generator for supplying direct current to a load, said generator having a field winding, a rectifier for rectifying current from an alternating-current supply source and for supplying the rectified current to said field winding, means comprising a saturable reactor for controlling the supply of current from said supply source to said rectifier, said reactor having a saturating winding, means for controlling the energization of said saturating winding comprising a space current device having an anode, a cathode and a control electrode, means for setting up across a current path a voltage which is substantially constant when the load current is equal to or less than a certain maximum value, means for impressing between said control electrode and said cathode a voltage equal to the difference of the voltage across said current path and a voltage proportional to the load voltage, and means responsive to an increase of load current above said maximum value for reducing the voltage across said current path.

7. In combination, a generator for supplying direct current to a load, said generator having a field winding, means for supplying current to said field winding, means for regulating the current supplied to said field winding comprising a saturable reactor having a saturating winding, means for controlling the energization of said saturating winding comprising a space current device having an anode, a cathode and a control electrode, a first resistor, a source of substantially constant voltage, a first circuit connecting said control electrode and said cathode comprising said resistor, said constant voltage source and said load, all in series, a second resistor, a unidirectionally conducting device, means for connecting across a current path comprising said first resistor and said constant voltage source a shunt current path comprising in series said second resistor and said unidirectionally conducting device to thereby form a second circuit, and means for setting up across said second resistor a voltage opposed to the voltage of said constant voltage source in said second circuit and having amplitude changes varying in response to changes of current supplied to the load.

8. The combination with a direct-current generator for supplying current to a load, said generator having a field winding, of a rectifier, a saturable reactor, means for supplying current from an alternating-current supply source through said reactor and said rectifier to said field winding, said reactor having a saturating winding, a first space current device having an anode, a cathode and a control electrode, means for supplying current from a direct-current source through the space current path of said space current device to said saturating winding, means for impressing a voltage upon the control electrode-cathode circuit of said first space current device for controlling the resistance of the space current path of said first space current device comprising a second space current device having an anode, a cathode and a control electrode, means for deriving from said alternating-current supply source a pulsating voltage having a substantially constant peak amplitude, means for setting up a voltage proportional to the current supplied to said load, means responsive to said last-named voltage and said pulsating voltage to set up an alternating voltage having amplitude variations corresponding to changes of load current, means for amplifying said alternating voltage, a first resistor, rectifying means responsive to said amplified alternating voltage for setting up across said first resistor a unidirectional voltage which varies in response to load current variations, a second resistor, a constant voltage source, a circuit connecting the control electrode and cathode of said second space current device comprising in series said second resistor, said constant voltage source and said load, the positive terminal of said load being connected to said cathode, one terminal of said second resistor being connected to said control electrode, the negative terminal of said constant voltage source being connected to the negative load terminal, a unidirectionally conducting device, and a circuit comprising said first and second resistors, said constant voltage source and said unidirectionally conducting device, all in series, the voltage across said first resistor being opposed in said circuit to the voltage of said constant voltage source, said unidirectionally conducting device being poled so as to permit current conduction in said last-named circuit only when the voltage across said first resistor is less than the voltage of said constant voltage source.

JOHN R. STONE.

REFERENCES CITED

The following references are of record in the file of this patent:

UNITED STATES PATENTS

| Number | Name | Date |
| --- | --- | --- |
| 1,998,741 | Steinmetz | Apr. 23, 1935 |
| 2,458,658 | Tyrner | Jan. 11, 1949 |
| 2,493,094 | Trucksess | Jan. 3, 1950 |